United States Patent [19]
Alatalo et al.

[11] Patent Number: 5,535,203
[45] Date of Patent: Jul. 9, 1996

[54] METHOD FOR IMPLEMENTING TIME SWITCHING, AND A TIME SWITCH

[75] Inventors: Hannu Alatalo; Marko Kokko, both of Oulu, Finland

[73] Assignee: Nokia Telecommunications OY, Espoo, Finland

[21] Appl. No.: 367,269

[22] Filed: Mar. 15, 1995

[30] Foreign Application Priority Data

Jul. 17, 1992 [FI] Finland .................................... 923295

[51] Int. Cl.$^6$ ................................................ H04Q 11/08
[52] U.S. Cl. .......................................... 370/66; 370/100.1
[58] Field of Search .................................. 370/66, 63, 64, 370/58.1–58.3, 102, 68, 100.1, 112; 375/354, 372, 374

[56] References Cited

U.S. PATENT DOCUMENTS

| | | | |
|---|---|---|---|
| 4,470,139 | 9/1984 | Munter | 370/66 |
| 4,471,479 | 9/1984 | Waas | 370/58.1 |
| 5,197,063 | 3/1993 | Nakano et al. | 370/58.1 |
| 5,351,238 | 9/1994 | Ashi et al. | 370/66 |

FOREIGN PATENT DOCUMENTS

| | | |
|---|---|---|
| 406191 | 1/1991 | European Pat. Off. . |
| 3214891 | 9/1991 | Japan . |
| 2254754 | 10/1992 | United Kingdom . |

Primary Examiner—Douglas W. Olms
Assistant Examiner—Ajit Patel
Attorney, Agent, or Firm—Cushman Darby & Cushman

[57] ABSTRACT

A time switch and a method for implementing time switching for signals of several different levels of hierarchy. The signals having a common frame structure which can be divided into blocks of different sizes, the blocks being switched differently from one another. According to the method, the contents of the time slots of an incoming signal are written into a memory, from which they are read at the memory locations indicated by switching data contained in an address control memory. In order that the time switching can be implemented in a more simplified manner than before, the contents of all time slots of a frame are continuously written into one memory block without synchronizing the writing with the frame.

5 Claims, 5 Drawing Sheets

PRIOR ART

METHOD FOR IMPLEMENTING TIME SWITCHING, AND A TIME SWITCH

BACKGROUND OF THE INVENTION

The invention relates to a method for implementing time switching, and to a time switch.

In this connection, time switch refers to a device capable of connecting the contents of any time slot in a frame structure of an incoming signal, to any time slot in an outgoing frame structure. In addition to a time switch, this device can also be called a time slot interchanger.

The problem involved in the switching of time slots in a TDM (Time Division Multiplex) signal, comprising frame blocks of different sizes (which will be illustrated below), is how the storage capacity can be efficiently utilized, in other words, how to minimize the need for connection memory. This problem is encountered, for instance, in the switching of an STM-1 signal in an SDH (Synchronous Digital Hierarchy) network. In the following, the structure of this signal will be described in greater detail.

Figure 1:
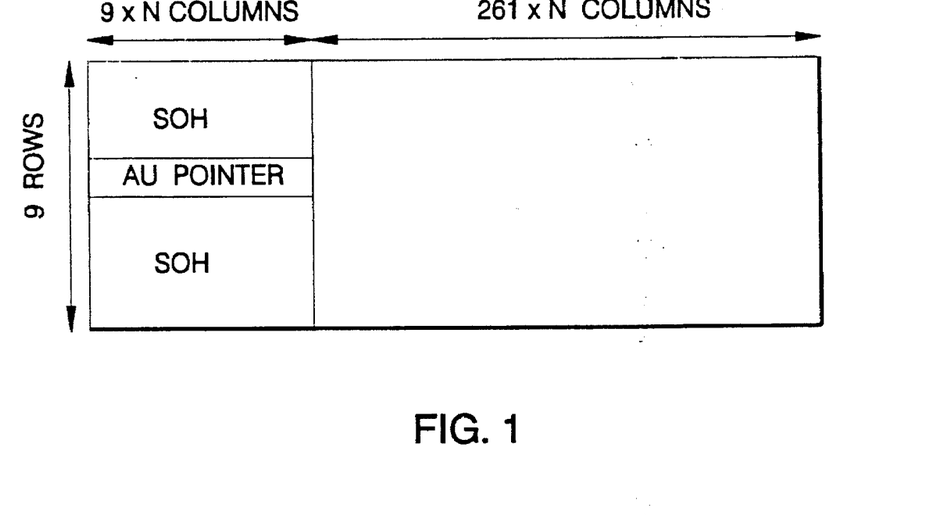
FIG. 1 shows the basic structure of a single STM-N frame.
Figure 2:
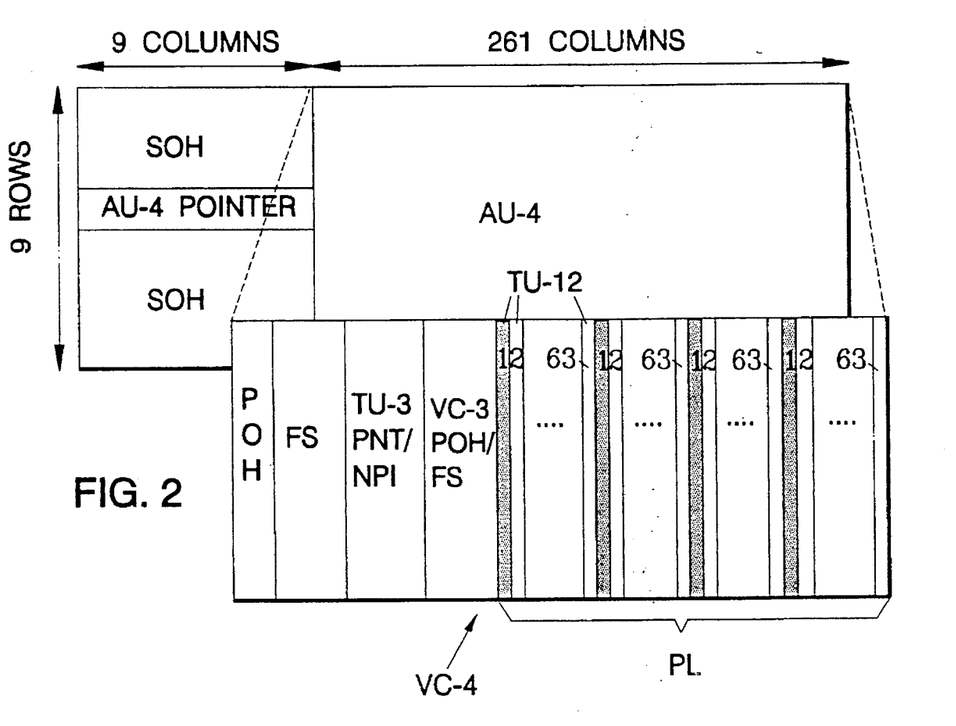
FIG. 2 shows the structure of a single STM-1 frame.

FIG. 1 illustrates the structure of an STM-N frame used in a SDH network, and FIG. 2 illustrates a single STM-1 frame. The STM-N frame comprises a matrix with 9 rows and N×270 columns so that there is one byte at the junction point between each row and a respective column. Rows 1–3 and rows 5–9 of the N×9 first columns comprise a section overhead SOH, and row 4 comprises an AU pointer. The rest of the frame structure is formed of a section having a length of N×261 columns and containing the payload section of the STM-N frame.

FIG. 2 illustrates a single STM-1 frame which is 270 bytes in length, as described above. The payload section comprises one or more administration units AU. In the example shown in the figure, the payload section consists of the administration unit AU-4, into which a virtual container VC-4 is inserted. (Alternatively, the STM-1 transfer frame may contain three AU-3 units, each containing a corresponding lower-level virtual container VC-3). The VC-4, in turn, consists of a path overhead POH located at the beginning of each row and having the length of one byte (9 bytes altogether), fixed stuff FS located at the following two columns, TU-3 pointers or a null pointer indicator NPI located at the following three columns, fixed stuff or VC-3 path overheads (VC-3 POH) located at the following three columns, and the actual payload section PL. The null pointer indicator NPI is used to separate the tributary unit groups TUG-3 comprising TU-3 units from the tributary unit groups TUG-3 comprising TU-2 units.

Figure 3:
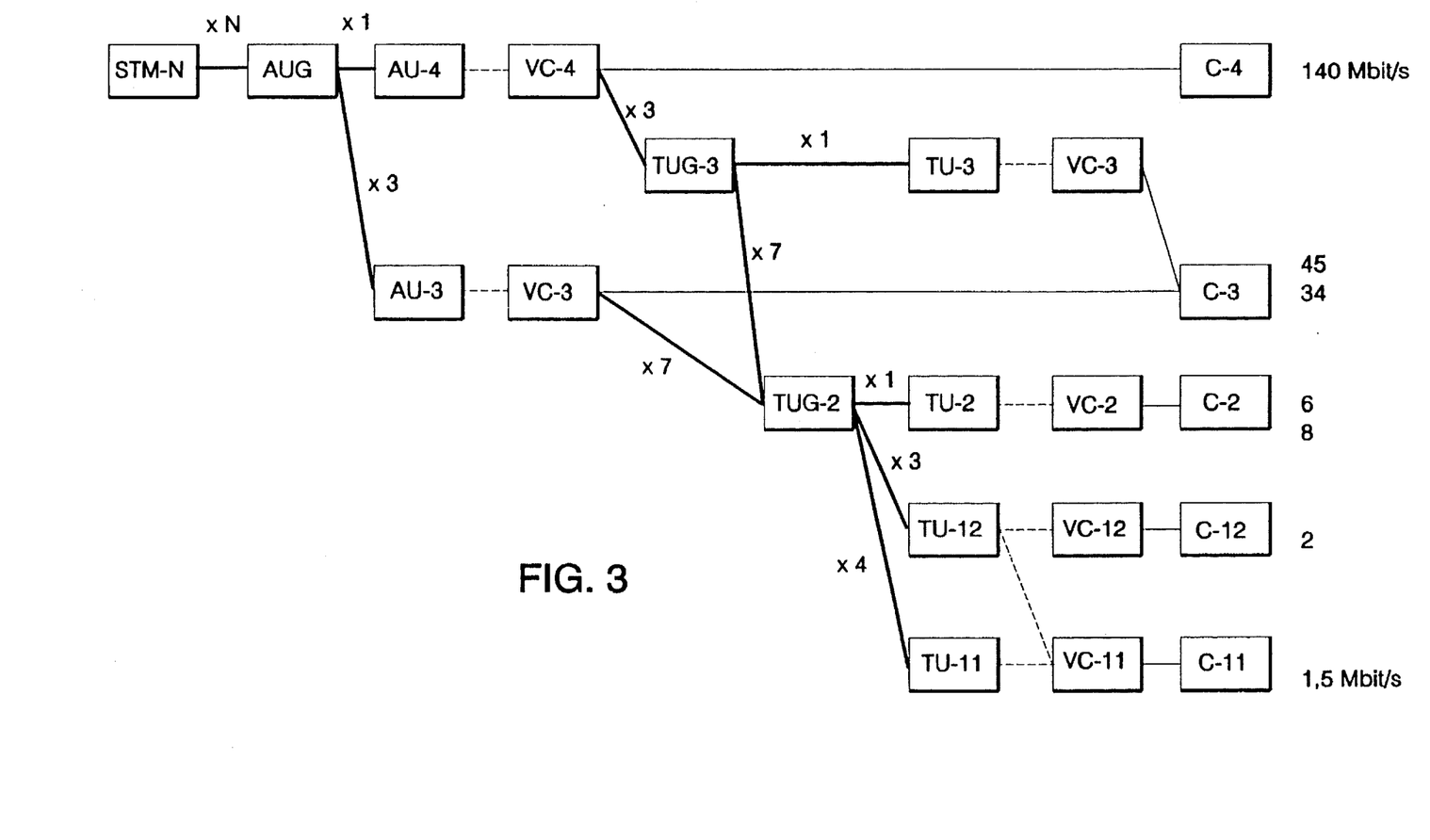
FIG. 3 shows the assembly of the STM-N frame from existing PCM systems.

FIG. 3 shows how the STM-N frame can be formed of existing bit streams. These bit streams (1.5, 2, 6, 8, 34, 45 or 140 Mbit/s, shown on the right in the figure) are packed at the first stage into containers C specified by CCITT. At the second stage, overhead bytes containing control data are inserted into the containers, thus obtaining the above-described virtual container VC-11, VC-12, VC-2, VC-3 or VC-4 (the first suffix in the abbreviations represents the level of hierarchy and the second suffix represents the bit rate). This virtual container remains intact while it passes through the synchronous network up to its point of delivery. Depending on the level of hierarchy, the virtual containers are further formed either into so-called tributary units TU or into AU units (AU-3 and AU-4) already mentioned above by providing them with pointers. An AU unit can be mapped directly into an STM-1 frame, whereas the TU units have to be assembled through tributary unit Groups TUG and VC-3 and VC-4 units to form AU units which then can be mapped into an STM-1 frame. In FIG. 3, the mapping is indicated by a continuous thin line, the aligning with a broken line, and the multiplexing with a continuous thicker line.

As is to be seen from FIG. 3, the STM-1 frame may be assembled in a number of alternative ways, and the contents of the highest-level virtual container VC-4, for instance, may vary, depending on the level from which the assembly has been started and in which way the assembly has been performed. The STM-1 signal may thus contain, e.g., 3 TU-3 units or 21 TU-2 units or 63 TU-12 units (or an arbitrary combination of some of the above-mentioned units). As the higher-level unit contains several lower-level units, e.g. the VC-4 unit contains TU-12 units (there are 63 such units in a single VC-4 unit, cf. FIG. 3), the lower-level units are mapped into the higher-level frame by interleaving, so that the first bytes are first taken consecutively from each one of the lower-level units, then the second bytes, etc. Accordingly, when the VC-4 signal contains, e.g., the above-mentioned 63 TU-12 signals, these signals are located in the VC-4 frame as shown in FIG. 2, i.e. the first byte of the first TU-12 signal is located first, then the first byte of the second TU-12 signal, etc. After the first byte of the last signal, i.e. the 63rd TU-12 signal, the second byte of the first TU-12 signal follows, etc.

The following table shows the contents of the columns of the STM-1 frame as a summary, depending on whether the frame contains TU-12, TU-2 or TU-3 units..

| Column Number | TU-12 | TU-2 | TU-3 |
| --- | --- | --- | --- |
| 1–9 | SOH | SOH | SOH |
| 10 | VC-4 POH | VC-4 POH | VC-4 POH |
| 11–12 | fixed stuff | fixed stuff | fixed stuff |
| 13–15 | NPI | NPI | TU-3 pointers |
| 16–18 | fixed stuff | fixed stuff | VC-3 POH |
| 19–81 | 1x63xTU-12 | 3x21xTU-2 | 21x3xTU-3 |
| 82–144 | 1x63xTU-12 | 3x21xTU-2 | 21x3xTU-3 |
| 145–207 | 1x63xTU-12 | 3x21xTU-2 | 21x3xTU-3 |
| 208–270 | 1x63xTU-12 | 3x21xTU-2 | 21x3xTU-3 |

The SDH system is described more closely, e.g., in References [1] to [3] (the references are listed at the end of the specification).

Figure 4:
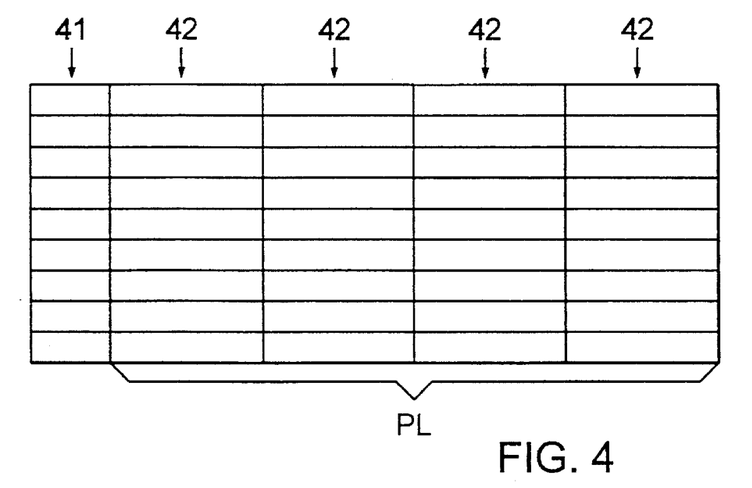
FIG. 4 shows an STM-1 frame and blocks of different sizes contained in it.

On the basis of the above, the frame of the STM-1 signal can be illustrated with respect to the switching as shown in FIG. 4. It consists of blocks of two types: e.g. the first 18 bytes, consisting of section and path overheads, on each row form the first block 41, and the following 63 bytes on each row form the second block 42, of which there are four successive ones in a single STM-1 frame 4. The data contained in the columns of the first block are not cross-connected (except for columns 13 to 18 in the case of TU-3 signals), but they continue in the same time slots even in the outgoing frame.

As stated above, the problem encountered in the switching of a signal of the type described above, consisting of frame blocks of different sizes, is how the storage capacity can be efficiently utilized; in other words, how to minimize the need for connection memory.

The drawback of the known time switches is that they demand a lot of storage capacity. Moreover, the memory control requires a fairly great deal of logic, which makes the practical equipment complicated.

SUMMARY OF THE INVENTION

The object of the present invention is to avoid the problems described above, and to provide a method by means of which the time switching of such a signal can be implemented in a much more simplified manner than before.

The idea of the invention is to employ merely one memory block, into which the contents of all time slots are written continuously, without synchronization with the phase of an incoming frame. Such use of the memory block is called "floating", i.e. the writing can be started from any location in the frame.

The solution of the invention renders it possible to simplify the time switching of TU signals of different levels, and to use a smaller amount of control logic and connection memory than before.

BRIEF DESCRIPTION OF THE DRAWINGS

In the following the invention will be described in more detail with reference to the examples illustrated in the attached drawings, in which.

DETAILED DESCRIPTION

Figure 5:
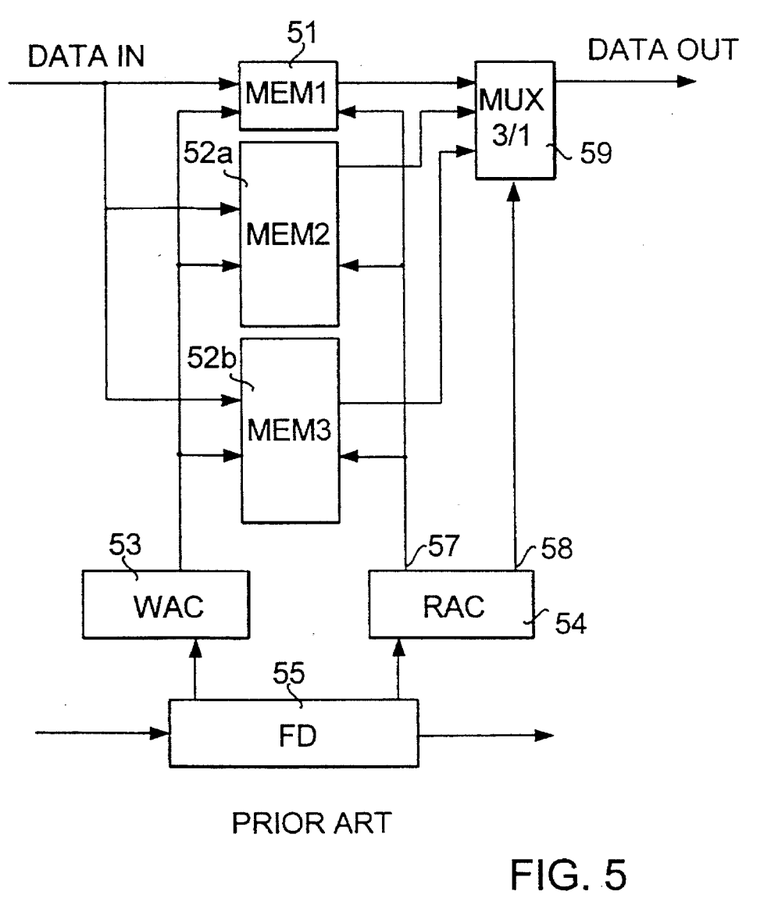
FIG. 5 shows the implementation of time switching with conventional technology.

FIG. 5 illustrate show the time switching of an STM-1 signal is implemented according to the prior art. The time switch comprises a separate memory block 51 for the frame block 41 formed, e.g., by section and path overheads, and two similar and mutually parallel memory blocks 52a and 52b for the frame blocks 42, which are to be cross-connected. The size of memory block 51 is thus 18 bytes, and that of memory blocks 52 is correspondingly 63 bytes. Writing into the memory blocks is controlled by a write unit 53, and correspondingly, reading from the memories is controlled by a read unit 54. Both of them are controlled by a phase identification circuit 55, to the input of which a frame synchronization signal is supplied, and which interprets the phase of the frame and supplies the phase information to the read and write units. The first 18 bytes of the STM-1 frame coming to the input of the time switch are written successively into the memory block 51, the following 63 bytes are written into, the memory block 52a, and the following 63 bytes into the memory block 52b. Thereafter, the writing is effected again into the memory block 52a, from which the previous data have already been read at this stage. When a new row begins, the first 18 bytes are again written to the memory block 51, etc. The write unit 53 indicates the current memory location on the basis of the phase of the frame. Each byte in the frame has thus a fixed location in the memory blocks 51, 52a and 52b.

Reading from the memory blocks takes place 63 bytes behind writing, i.e. the cross-connection delay is 63 bytes long. The memory locations of an address control memory (not shown) included in the read unit are read cyclically— one location per each time slot. The contents of a memory location indicate the memory block and the memory location from which the information is read. The read unit 54 gives thus its output line 57 a read address, which indicates the memory location from which the reading is taking place; in addition, it gives its output line 58 a block address, which indicates the memory block from which the reading is taking place. On the basis of these data, an outgoing frame is assembled in a 3/1 multiplexer unit 59.

The example shown in FIG. 5 relates to an STM-1 signal, as stated above. Generally speaking, it can be stated that there must be a separate memory block for each frame block size and two memory blocks for two or more successive frame blocks of the same size.

The known solution described above demands a lot of storage capacity, it is complicated to address the memory, and both the read and write units must have accurate information on the current phase of the frame. In addition, the control of the different memory blocks requires a fairly great deal of logic.

Figure 6:
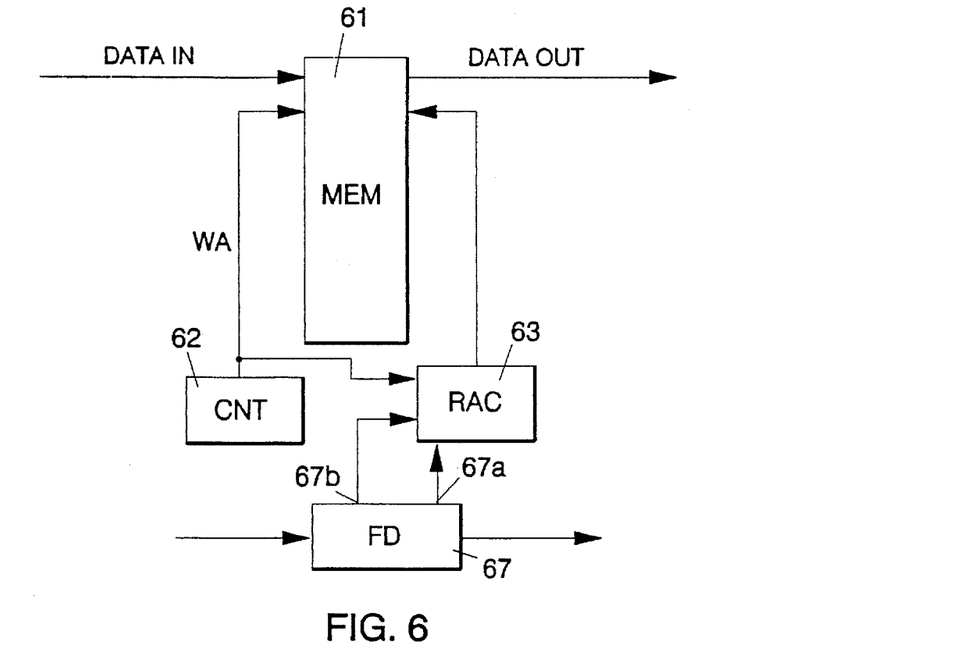
FIG. 6 shows a time switch and implementation of time switching according to the invention.
Figure 7:
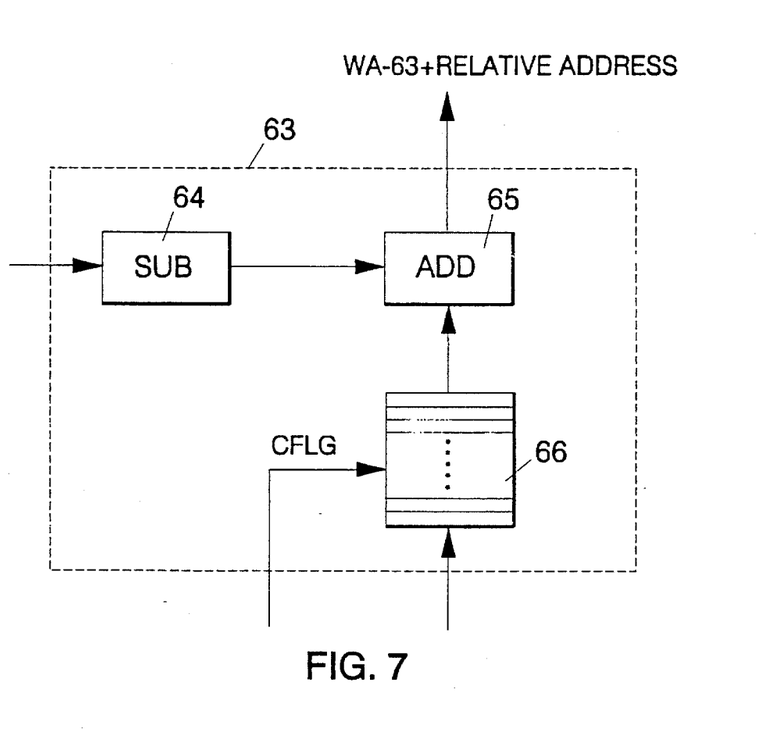
FIG. 7 is a more detailed view of the read unit of the time switch shown in FIG. 6.

FIGS. 6 and 7 illustrate a solution according to the invention, for implementing time switching. FIG. 6 is a block diagram illustrating the structure of the entire time switch, and FIG. 7 is a more detailed view of the read unit 63. The time switch (FIG. 6) comprises only one memory block 61, which is twice as large as the largest frame block. In this case, the size of the memory block 61 is thus 126 bytes. Writing into the memory is controlled by a simple counter 62, which is not in synchronization with the incoming signal frame (but is in synchronization with the clock signal), and which counts continuously from 1 to 126, and is incremented or decremented by one in connection with each writing event. The bytes of an incoming signal containing frame blocks of different sizes are written continuously into the memory at the address WA given by the counter, the address being incremented by one for each byte. The writing is effected without synchronization with the incoming signal frame, i.e. starting from an arbitrary location in the frame.

The write address WA given by the counter 62 is also supplied to a read unit 63, more specifically to a subtractor circuit 64 therein (FIG. 7), which generates the delay by subtracting the value 63 from the write address (in this case the cross-connection delay has the length of 63 bytes, and, in general it is as long as the duration of the largest frame block in bytes). The read address thus obtained is supplied to an adder circuit 65, which adds the read address to the switching data obtained from the address control memory 66. The address control memory has the length of 63 memory locations, it is read cyclically in the manner described above, and it gives switching data to each time slot to be cross-connected.

In the address control memory, it is preferable to use a relative read address as the switching data. This means that the switching data at each memory location in the address control memory indicates the relative transition of the data contained in the time slot within the frame structure. The relative address is positive if the signal leaves the time switch in a relatively earlier time slot than it came in, and negative in the Opposite case. A relative address can have (integer) values between −62 and +62, but not, however, in every time slot; each time slot has its own acceptable range within which the relative read address can be. The first time slot of each row of each frame block 42 can thus have only positive address values (from 0 to +62), the second time slot can have address values from −1 to +61, etc., and the last time slot can have only negative values and zero, i.e. address values from 0 to –62 (all of the above-mentioned lowest and highest values included). A time switch based on the relative address is the object of copending Finnish Patent Application No. 923296 filed Jul. 19, 1992 that application can be referred to for a more detailed description. It is, however, not necessary to use the relative read address, but it is also possible to use the known absolute address. However, the latter case entails more complicated equipment.

The address control memory receives information on the phase of the frame from an output 67a of a phase identification circuit 67. A column flag CFLG, which provides information on, when columns 1 to 12 are in progress in the frame, is obtained from another output 67b of the phase identification circuit 67. When this flag is valid (during these columns), the output of the address control memory is forced to become zero, i.e. during these columns, the adder circuit 65 is not given cross-connection data. On account of the relative address zero, the data in the columns passes "straight" through the switch (i.e. leaves the switch in the same time slot as it came in). The output of the adder circuit 65 has thus the value (WA-63), whereas each time slot of the blocks 42 has the value (WA-63+relative read address), in which the relative read address is within a certain range depending on the time slot, as stated above. In addition, the contents of the address control memory must be interpreted at columns 13 to 18 (cf. the above table); i.e., it must be verified whether the switching instruction is reasonable. If other columns than columns 13 to 15 are indicated during these columns, the instruction is not reasonable, and a column relating to any TU-3 signal cannot be concerned. The same applies to columns 16 to 18 as well. If the switching instruction is not reasonable, the null pointer indicator NPI is generated into columns 13 to 15, and correspondingly fixed stuff into columns 16 to 18. If the instruction is a reasonable TU-3 level switching instruction, it may be part of a TU-3 or TU-2 switching instruction, or it may be a TU-12 switching instruction. The column in question can be switched in any case, for if a TU-2 or TU-12 signal is switched by a TU-3-type instruction, it is switched from an incoming TUG-3 unit, which in this case cannot contain a TU-3 signal. Therefore, it does not matter if the location of the null pointer indicator should change.

Figure 8:
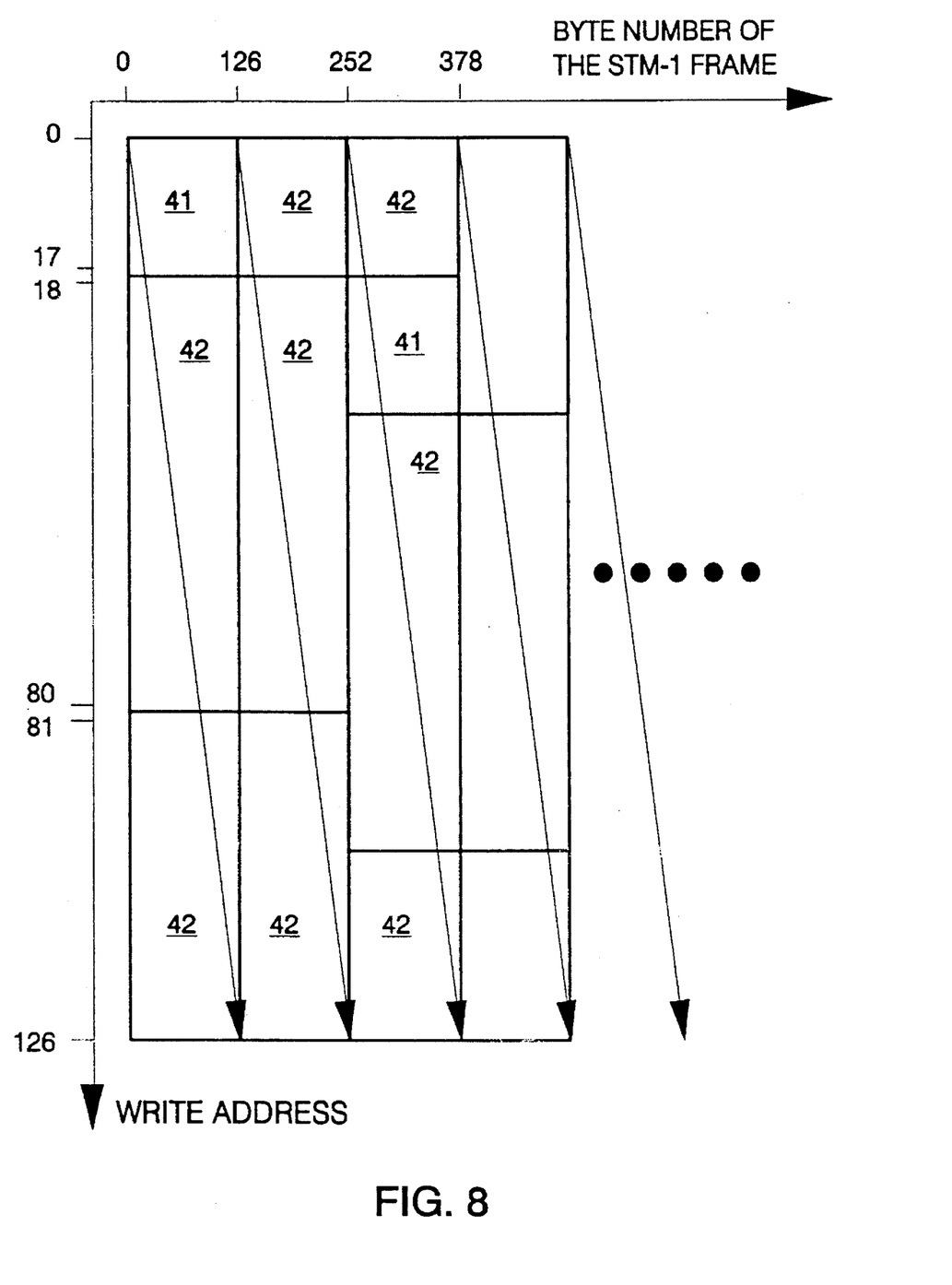
FIG. 8 illustrates writing into the memory in the time switch of the Invention.

FIG. 8 illustrates how the different frame blocks of the STM-1 signal are written into the memory 61. The write address (1 to 126) is shown on the vertical axis, and the byte number of the STM-1 frame is shown on the horizontal axis. The arrows illustrate how the write address changes when the byte number grows. The area 41 corresponds to the contents of columns 1 to 18 (frame block 41), and the areas 42 correspond to the contents of the four successive frame blocks 42, having the length of 63 bytes. The rest of the second frame block 42 is thus written to corresponding memory locations as the contents of columns 1 to 18, which, at this stage, have already been read from the memory.

FIG. 8 shows only one example of writing into the memory. In this example, the STM-1 frame starts from the write address 1, but it may also start from any other memory location in accordance with the principle of "floating" use of the memory 61.

Even though the invention has been described above with reference to the examples shown in the attached drawings it is obvious that the invention is not restricted to them but may be modified in various ways within the inventive idea disclosed above and in the accompanying claims. Even though the invention has been described with reference to an SDH specific STM-1 signal, the solution of the invention can also be used in connection with any time division multiplex signal the frame structure of which can be divided into blocks as described above.

References

[1] CCITT Blue Book, Recommendation G.709: "Synchronous Multiplexing Structure", May 1990.

[2] SDH—Ny digital hierarki, TELE 2/90.

[3] CCITT Blue Book,. Recommendation G.783: "Characteristics of Synchronous Digital Hierarchy (SDH) Multiplexing Equipment Functional Blocks," August 1990, Annex B.

We claim:

1. A method for switching signals of a plurality of levels of hierarchy, which signals have a common frame structure which can be divided into blocks of different sizes, comprising:

(a) writing the bytes of each of a succession of incoming ones of such signals into a memory block of a time switch, the memory block being at least twice as large as the largest frame block of a respective said incoming signal, said writing being performed continuously into said memory block at a succession of write addresses given by a counter which is in synchronization with a clock signal of said time switch but is not synchronized with frame blocks of said incoming signal, incrementing or decrementing the write address by one for each successive byte, so that writing of a frame block may start at any memory location of said memory block, thereby making floating use of said memory block;

(b) supplying the write address given by the counter, to a subtractor unit of a read unit, and thereby generating a delay by subtracting a cross-connection delay of a given length which is at least as long as the duration of the largest frame block of said incoming signal, in bytes, to thereby obtain a read address;

(c) supplying said read address to an adder which adds the read address to switching data obtained from an address control memory which has a given length of memory locations and is read cyclically, thereby giving switching data to each time slot to be cross-connected; and (d) reading contents from said memory block at a succession of read address locations indicated by said switching data, and providing the contents thereby read, as a data out signal having an outgoing frame structure.

2. The method of claim 1, wherein:

in steps (c) and (d), using a relative reading address as said switching data, so that the switching data at each memory location of said address control memory indicates the relative transition of the data contained in a respective time slot with the frame structure.

3. The method of claim 1, further comprising:

determining the largest frame block of said incoming signal, and providing as said memory block, a memory block which is exactly twice as large as said largest frame block.

4. A time switch capable of connecting the contents of any time slot in the frame structure of an incoming signal, to any time slot in an outgoing frame structure, comprising:

a memory block which is at least twice as large as the largest frame block of said incoming signal;

a counter which is in synchronization with a clock signal of said time switch but is not synchronized with frame blocks of said incoming signal;

writing means, controlled by said counter, for continuously writing successive bytes of said incoming signal into said memory block at a succession of write addresses given by said counter, which increments or decrements the write address by one for each successive byte, so that writing of a frame may start at any memory location of said memory block, for making floating use of said memory block;

an address control memory which has a given length of memory locations and is read cyclically, thereby giving switching data to each time slot which is to be cross-connected by said time switch;

a read unit having a subtractor unit arranged to receive write addresses given by said counter and generating therefrom a delay by subtracting a cross-connection delay of a given length which is at least as long as the largest from block of said incoming signal, in bytes, to thereby obtain a read address;

said read unit further including an adder for adding each read address to switching data obtained from said address control memory, and thereby causing said read unit to read contents from said memory block at a succession of read address locations indicated by said switching data, and for providing the contents thereby read, as a data out signal having an outgoing frame structure.

5. The time switch of claim 4, wherein:

said memory block is exactly twice as large as said largest frame block.

* * * * *

UNITED STATES PATENT AND TRADEMARK OFFICE
CERTIFICATE OF CORRECTION

PATENT NO.    : 5,535,203

DATED         : July 9, 1996

INVENTOR(S)   : ALATALO et al.

It is certified that error appears in the above-identified patent and that said Letters Patent is hereby corrected as shown below:

On the title page: Item [22], should read --Pct filed 7-8-93--.

add item [86], to include:
--PCT No.:  PCT/FI93/00291--;
--§ 371 Date:  March 15, 1995--;
--§ 102(e) Date:  March 15, 1995--; and add item [87], to include:
--PCT Pub. No.:  WO94/03023--;
--PCT Pub. Date:  February 3, 1994--.

Signed and Sealed this

Eighth Day of October, 1996

Attest:

BRUCE LEHMAN

Attesting Officer

Commissioner of Patents and Trademarks